United States Patent [19]

Heeres et al.

[11] 3,928,374
[45] Dec. 23, 1975

[54] NITROIMIDAZOLE DERIVATIVES

[75] Inventors: Jan Heeres, Turnhout; Joseph Hector Mostmans, Antwerpen; Robert Maes, Vosselaar, all of Belgium

[73] Assignee: Janssen Pharmaceutica N.V., Beerse, Belgium

[22] Filed: Apr. 18, 1974

[21] Appl. No.: 461,821

Related U.S. Application Data

[63] Continuation-in-part of Ser. No. 372,567, June 22, 1973, abandoned.

[52] U.S. Cl.......... 260/309; 260/239 E; 260/240 A; 424/273

[51] Int. Cl.$^2$......................................... C07D 233/95
[58] Field of Search................................... 260/309

[56] References Cited
UNITED STATES PATENTS

| | | | |
|---|---|---|---|
| 3,696,116 | 10/1972 | Jeanmart et al.................... | 260/309 |
| 3,796,704 | 3/1974 | Metzger et al.................. | 260/240 K |

*Primary Examiner*—Sherman D. Winters
*Attorney, Agent, or Firm*—Salvatore R. Conte

[57] ABSTRACT

Compounds of the class of N-[2-(2-R-5-nitro-1-imidazolyl)ethyl]carbamates and thiocarbamates useful in the treatment of parasitic diseases.

25 Claims, No Drawings

NITROIMIDAZOLE DERIVATIVES

CROSS-REFERENCE TO RELATED APPLICATION:

The application is a continuation-in-part of our application Ser. No. 372,567, filed June 22, 1973 now abandoned.

BACKGROUND OF THE INVENTION:

The invention pertains to the field of N-(nitroimidazolylethyl)carbamate and thiocarbamate esters which demonstrate antiparasitic activity and are useful in the treatment of, for example, the protozoal parasitic disease trichomoniasis. The subject compounds differ from those of the prior art by, among other things, the nature of the ester function. The prior art may be represented by the following references:
1. Arzneim.-Forsch. 20, 52 (1970);
2. U.S. Pat. Nos. 3,520,899 and 3,646,027;
3. British Pat. Nos. 1,253,002 and 1,264,937; and
4. Chem. Abstr. 73, 98950q (1970).

DESCRIPTION OF THE INVENTION

This invention relates to novel N-[2-(2-R-5-nitro-1-imidazolyl)ethyl]carbamates and thiocarbamates which may be represented by the following formula:

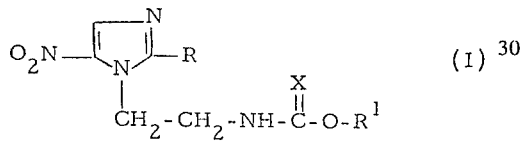   (I)

wherein:
X is a member selected from the group consisting of O and S;
R is a member selected from the group consisting of hydrogen, loweralkyl, phenyl, halophenyl, halomethyl and hydroxymethyl; and
$R^1$ is a member selected from the group consisting of loweralkyl, loweralkenyl, cycloalkyl and loweralkoxyloweralkyl.

The therapeutically active non-toxic acid addition salts of the foregoing compounds (I) are also embraced within the scope of this invention.

As used herein, "loweralkyl" and "loweralkoxy" may be straight or branch chained and have from 1 to 5 carbon atoms, such as, for example, methyl, ethyl, propyl, isopropyl, butyl, pentyl and the like alkyls, and, respectively, the corresponding alkoxys such as methoxy, ethoxy, propoxy, isopropoxy, etc. The term "halo" refers to halogens of atomic weight less than 127, i.e., fluoro, iodo, bromo and chloro, preferably fluoro. The term "loweralkenyl" indicates an unsaturated hydrocarbon having from 3 to 5 carbons wherein the unsaturation occurs, in relation to the ester linkage, at the beta-, gamma- or delta-carbon atoms, preferably allyl. The term "cycloalkyl" includes cyclopentyl and cyclohexyl.

The compounds of formula (I) are easily prepared by reacting an appropriate amino compound of formula (II), wherein R is as previously defined, with an appropriate haloformate or halothioformate of formula (III), wherein the halo is preferably chloro and X and $R^1$ are as previously defined, in a suitable inert organic solvent, such as, for example, an aromatic hydrocarbon, e.g., benzene, toluene, xylene and the like, and a halogenated lower hydrocarbon, e.g., methylene chloride, chloroform and the like. Water soluble acid addition salts of (II), preferably mineral acid salts, e.g., hydrohalides, nitrates, sulfates and the like, may also be utilized thereby allowing for the use of water and aqueous mixtures of the foregoing organics as solvents. The addition of a base, such as, for example, an alkali metal carbonate or bicarbonate, to the reaction mixture may be advantageously employed to combine with the acid released. The foregoing reaction may be illustrated by the following reaction scheme:

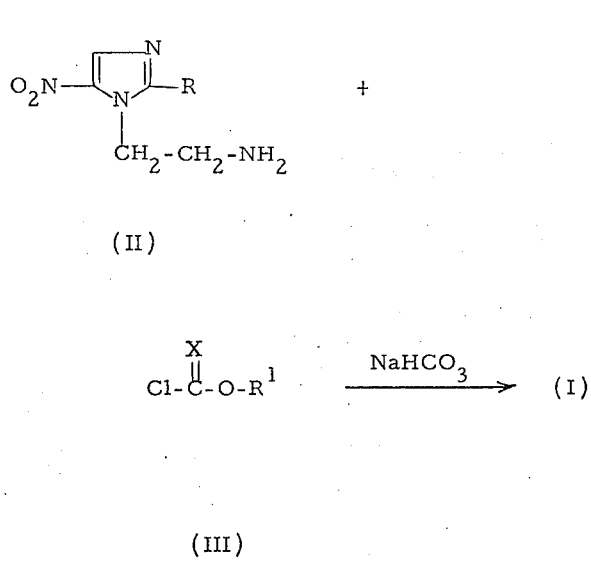

The bases of formula (I) may be converted to the corresponding therapeutically active non-toxic acid addition salts by reaction with an appropriate inorganic acid, such as, for example, hydrochloric, hydrobromic, hydriodic, sulfuric, phosphoric, nitric and the like acids, or with an appropriate organic acid, such as, for example, acetic, propionic, glycolic, lactic, oxalic, malonic, sulfamic, p-toluenesulfonic and the like acids. In turn, the salts of formula (I) may be converted to the corresponding free base form by conventional treatment with suitable alkali.

The compounds of formula (I) may alternatively be prepared by reacting in an appropriate solvent an amine of formula (II) with an appropriate thiolester of formula (IV) wherein X and $R^1$ are as previously defined and wherein $R^2$ may represent widely different groups but is preferably loweralkyl or substituted loweralkyl. Preferred substituents on said substituted loweralkyl are ionizable groups, such as carboxyl. The presence of such an ionizable group has the advantage that the reaction may then be carried out in an aqueous medium and that the thiol compound which is liberated during the course of the reaction is easily bound by the addition of alkali, avoiding thus the promulgation of unpleasant odors, generally, associated with thiols. Otherwise the reaction is conveniently carried out in an appropriate organic solvent such as, for example, a lower alkanol, e.g., methanol, ethanol, propanol and the like alcohols.

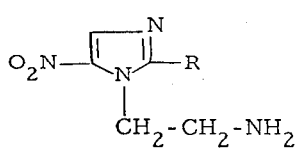

(II)

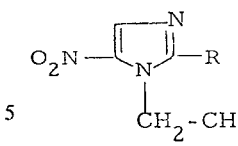

(VII)

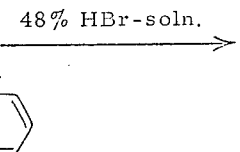

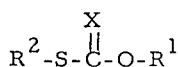

(IV)

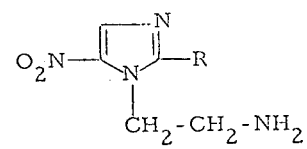

(II)

The starting amino compounds of formula (II) are readily obtained by the following 2-step reaction sequence:

Step 1: An appropriate nitroimidazole of formula (V), wherein R is as previously defined, is reacted with 1-benzoylaziridine (VI) in a suitable organic solvent such as, for example, a halogenated lower hydrocarbon, e.g., dichloromethane, chloroform and the like, preferably acidified with acetic acid. Although not critical, it has been found advantageous to first treat the nitroimidazole (V) with either boron fluoride methyl ether or boron fluoride ethyl ether and then, to the resultant complex, slowly add the 1-benzoylaziridine (VI). The interaction of (V) with (VI) is generally maintained at low temperature, below 30°C, and, preferably between −10° to 10°C.

Alternatively, the compounds of formula (II) may be obtained by similar hydrobromic acid treatment of analogous 2-[2-(2-R-5-nitro-1-imidazolyl)ethyl]-1,3-isoindolinediones (VIII).

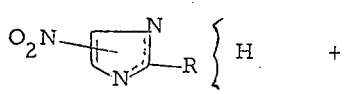 H +

(V)

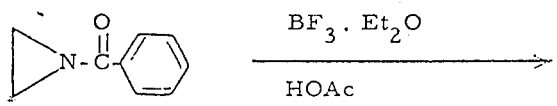

(VIII)

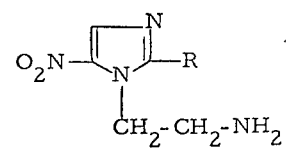

(II)

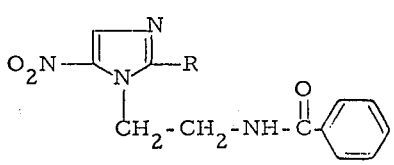

(VI)

(VII)

Step 2: The thus-obtained N-[2-(2-R-5-nitro-1-imidazolyl)ethyl]benzamide (VII) is then converted to the corresponding amino compound of formula (II) by treatment with concentrated mineral acid, for example hydrobromic or hydrochloric acid, preferably under reflux.

The compounds of formula (II) wherein R is a hydroxymethyl or halomethyl group may be prepared starting from N-[2-(2-methyl-5-nitro-1-imidazolyl)ethyl]benzamide (VII-a) by the following reaction sequence. (VII-a) is first reacted with an appropriate aldehyde, preferably benzaldehyde. This condensation reaction is conveniently carried out by stirring (VII-a) and benzaldehyde together in the presence of an appropriate strong base such as a metal alkoxide, e.g., sodium methanolate, in an appropriate solvent, such as, for example, dimethylsulfoxide. The thus-obtained N-[2-(5-nitro-2-styryl-1-imidazolyl)ethyl]benzamide (X) is then converted into the N-[2-(2-formyl-5-nitro-1-imidazolyl)ethyl]benzamide (XI) by conventional ozone treatment. Such ozonization is conveniently carried out by contacting (X) with ozone in an appropriate organic solvent, such as, for example, a mixture of an alkanol and a halogenated alkane, e.g., a mixture of methanol and methylene chloride, followed by the addition of an appropriate reducing agent, such as sodium metabisulfite to break down the ozonide which is formed in the reaction. The aldehyde (XI) is then converted into the corresponding alcohol by treatment with a suitable reducing agent, such as, for example, sodium borohydride. The corresponding amine (II-a) is then obtained by acid hydrolysis of (VII-b) in the previously described manner.

The amines of formula (II) wherein R is a halomethyl group are conveniently obtained by converting (VII-b) into the corresponding halide (VII-c) with conventional halogenating agents, such as, for example, thionyl chloride, phosphorpentachloride, phosphorpentabromide and the like and hydrolyzing (VII-c) in order to obtain the amine of formula (II-b).

The foregoing reactions are more fully illustrated in the following schematic representation:

It is believed that the amino compounds of formula (II) and the acid addition salts thereof, wherein R is phenyl, halophenyl, halomethyl and hydroxymethyl, are novel and, in view of their utility as precursors herein, they constitute an additional feature of this invention.

The nitroimidazole derivates of formula (I) and acid addition salts thereof demonstrate anti-parasitic activity, particularly anti-protozoal activity, such as, for example, against the causative organisms of the protozoal parasitic diseases trichomoniasis, enterohepatitis and amoebiasis. Typical of such causative organisms are *Trichomonas vaginalis*, *Trichomonas columbae*, *Histomonas maleagridis* and *Entamoeba histolytica*. It will, of course, be understood that the subject compounds differ in their degree of efficacy against these various organisms.

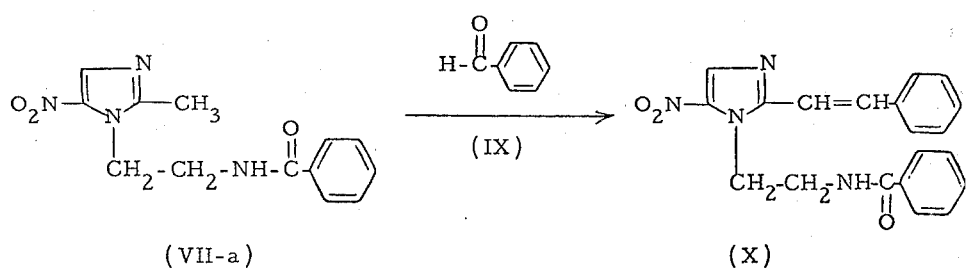

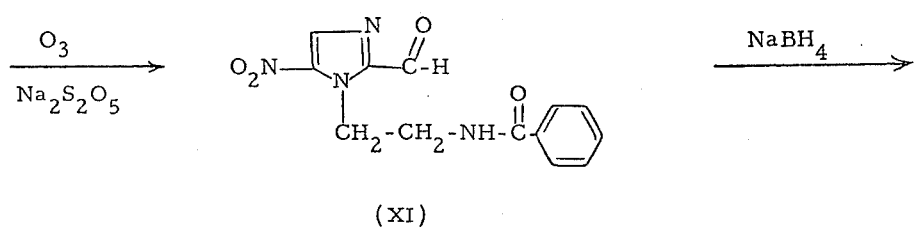

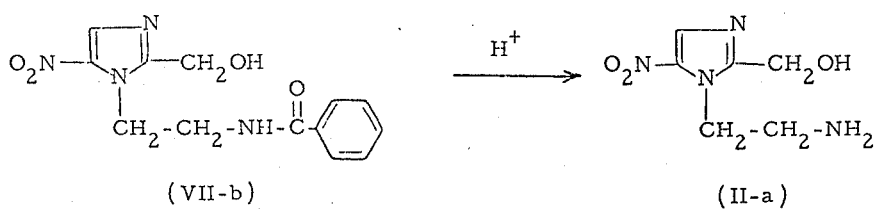

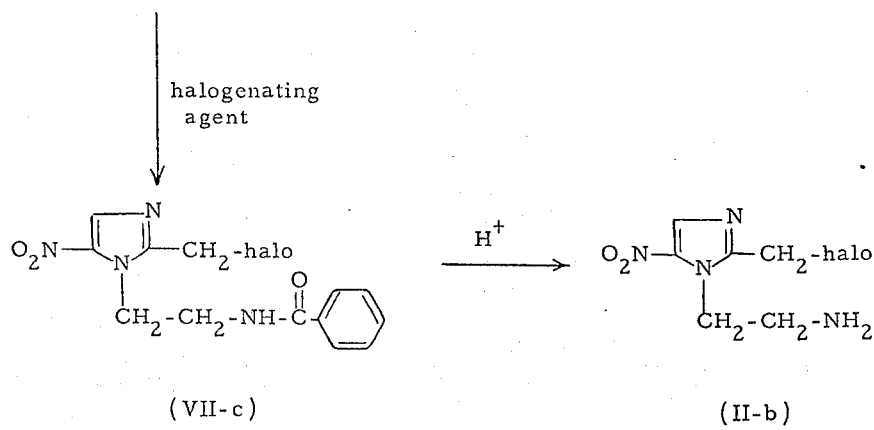

The subject compounds are particularly useful, as demonstrated in the following tests, in the treatment of the protozoal disease, trichomoniasis, which is caused by parasites of the genus Trichomonas. They are effective against the particularly troublesome form of trichomoniasis known as *T. vaginalis vaginitis*, caused by infestation of the vagina with *T. vaginalis*.

A. Trichomonas vaginalis in mice:

Adult mice are artificially infected by a subcutaneous injection of 1 × 10⁶ (±100,000) living *Trichomonas vaginalis* at the start of the experiment (day 0). Treatment with the compound under investigation is begun simultaneously with an oral standard dose of 160, 80, 40, 20, 10 or 5 mg/kg body weight. The particular dose for each group of mice is repeated for 4 consecutive days. All animals are sacrificed on day 7 of the experiment and presence or absence of Trichomonas at the injection site is used as the criterion for effectiveness of the compound. All control animals receiving saline instead of active compound are found to be highly positive for Trichomonas 7 days after the infection. It has been found that, at oral dose levels of about 10–160 mg/kg, the animals become negative (i.e., no Trichomonas are found at the injection site) after treatment with five repeated daily doses of the subject compounds.

B. Trichomonas vaginalis in rats:

Young female rats (average body weight: 100 g) are ovarectomized and treated 10 days thereafter with 10 mg of ovocycline. Ten days after such ovocycline treatment, the rats are in pseudooestrus and at that time they are infected intravaginally with 3 to 4 × 10⁶ living *Trichomonas vaginalis* per rat. One week thereafter a fresh vaginal smear is taken for "control" purposes indicating the presence or absence of Trichomonas. The positive animals are then treated orally with the compound under investigation at standard dose levels of 40, 20, 10, 5 and 2.5 mg/kg body weight given for 5 consecutive days. Treatment is then stopped and 1 week later a vaginal smear is taken and again examined for the presence or absence of Trichomonas. According to this test, the animals become negative to Trichomonas at dose levels of about 2.5–40 mg/kg.

C. Trichomonas columbae in pigeons:

Adult pigeons (average body weight: 500 g) are artificially infected by gavage into the gizzard with about 100,000 living *Trichomonas columbae*. About 1 week thereafter a microscopic control examination of the mucus taken from the larynx is carried out and the animals positive for Trichomonas are used for testing the subject compounds. Treatment consists of a single or repeated (5 days) oral administration of either saline (control) or a calculated standard dose of 20, 10, 5 or 2.5 mg per animal of the particular compound. Two weeks after such treatment a microscopic examination of the mucus is again performed. Presence or absence of Trichomonas is the criterion for drug effectiveness. In general, doses ranging from 2.5–2.0 mg per pigeon for 5 days have been found effective in killing the Trichomonas.

In treating *T. vaginalis vaginitis*, the subject compounds may be administered either orally or topically in the form of pharmaceutical compositions, preferably in unit dosage form, comprising an effective antiprotozoal amount of the particular compound in admixture with a pharmaceutical carrier. For oral administration, unit dosage forms such as tablets, capsules or powders are normally employed which may contain from about 25 to about 500 mg of active ingredient, and, preferably, from about 25 to about 250 mg. These are prepared by techniques known in the art, and contain the usual diluents, granulating agents, extenders, fillers, lubricating agents and the like known to be satisfactory for the compounding of tablets, capsules and powders. If desired, tablets may be sugar coated or enteric coated by standard techniques. Alternatively, the subject compounds may be administered orally in liquid pharmaceutical vehicles such as solutions, emulsions, syrups, elixirs, suspensions and the like containing the diluents, flavoring agents, preservatives, coloring agents and the like customarily employed in the pharmaceutical art. With such liquid formulations, a unit dosage form may consist of a teaspoonful, tablespoonful and the like. Parenterals may also be employed, in which case a suitable carrier is employed, for example, sterile water, particularly with the water-soluble salts of formula (I), although other liquid injectible carriers may be used as can other ingredients, for example, to aid solubility or for preservative purposes. It is preferred to administer the subject compounds orally at a dose level of from about 25–1000 mg/day, in either single or divided doses.

Typical examples of solid unit dosage forms for oral use are the following:

A. Capsules (10,000 capsules, 250 mg active ingredient)

|  | Grams |
|---|---|
| O-methyl N-[2-(2-methyl-5-nitro-1-imidazolyl)ethyl]thiocarbamate | 2500 |
| Lactose | 1500 |
| Starch | 400 |
| Talc | 400 |
| Calcium stearate | 10 |

B. Tablets (5000 compressed tablets, 50 mg active ingredient)

|  | Grams |
|---|---|
| Methyl N-[2-(2-isopropyl-5-nitro-1-imidazolyl)ethyl]carbamate nitrate | 250 |
| Starch | 375 |
| Dibasic calcium phosphate hydrous | 2500 |
| Calcium stearate | 10 |

For topical application, vaginal creams or suppositories containing the active ingredient may be used. To illustrate, a cream is prepared by mixing sufficient quantities of hydrophilic ointment and water, containing from about 5–10% by weight of the active ingredient, to produce a cream having the desired consistency.

In addition to the anti-parasitic activity of the subject compounds against Trichomonas, they have also been found effective against Histomonas. Enterohepatitis is a disease occurring primarily in turkeys and is caused by the protozoan parasite *Histomonas meleagridis*. It is also known as turkey blackhead disease. The nitroimidazole derivatives of formula (I) and salts thereof are useful in the prevention and treatment of this disease and for this purpose are administered to turkeys mixed with an element of turkey sustenance, i.e. in the feed or drinking water. Although the optimum dose level will depend on the particular compound employed and the severity of the infection, good control of enterohepatitis is obtained by orally administering to the turkeys a feed containing from about 0.003% to about 0.1% by weight of active ingredient. When the material is administered via the drinking water, somewhat higher levels may be employed, especially for therapeutic use. For instance, the drinking water may contain up to about 0.2% by weight of the active ingredient with good results.

The following test procedure demonstrates the antiprotozoal activity of the subject compounds against *Histomonas meleagridis* in which an increase in turkey body weight is taken as the indicator of such activity. Young turkeys (3–4 weeks old; 120–150 g body weight) are infected rectally (in the cloaca) with 2 ml of a suspension containing *Histomonas meleagridis* (day 0). The suspension is prepared by trituration of the liver and both caeca of an artificially infected turkey in 50 ml saline. All animals are individually caged and receive food and water ad libitum during the experimental session. Food consists of a commercial turkey mash containing neither feed additive, coccidiostat nor other medication. The compound under investigation is mixed with the feed at different concentrations (0.01, 0.02, 0.05, 0.1 . . . %) and given to the animals from day 2 until day 9. Body weight increase, feed consumption and mortality are noted daily. Taking the mean increase in body weight (i.e., the ratio of body weight at day 7 over body weight at day 0) as a measurement, the body weight increase for the non-infected controls at day 7 as compared to day 0 is 160% whereas the body weight increase for the infected controls for the same period is only 120%. Significant compound effects are said to occur if the body weight increase of the treated animals on day 7 is at least 150% as compared to the body weight at day 0. It has been found that, at feed concentrations of about 0.01–0.1%, the subject compounds afford such 150% increase or more in weight.

In view of the anti-parasitic activity of the subject compounds, there is provided herein a method for inhibiting protozoal growth which comprises administering internally or applying topically to a warm blooded animal infected with protozoal organisms a pharmaceutical composition, preferably in unit dosage form, comprising an effective anti-protozoal amount of a member selected from the group consisting of a nitroimidazole derivative of formula (I) and the therapeutically active acid addition salts thereof in admixture with a pharmaceutical carrier.

Among the preferred compounds hwerein are those wherein each of R and R¹ in formula (I) is loweralkyl:

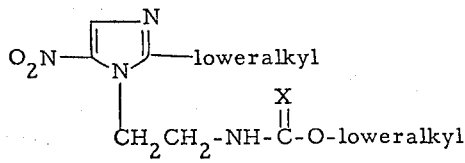

When X in formula (I) is S, it is preferred to have R¹ equal loweralkyl.

The following examples are intended to illustrate, but not to limit, the scope of the present invention. Unless otherwise stated, all parts are by weight.

A. PREPARATION OF FORMULA (II) PRECURSORS

Example I

A mixture of 17 parts of 2-[2-(2-methyl-5-nitro-1-imidazolyl)ethyl]-1,3-isoindolinedione and 150 parts of hydrobromic acid solution 48% is stirred and refluxed overnight (about 16 hours). The reaction mixture is allowed to cool to room temperature. The precipitated phthalic acid is filtered off and the filtrate is evaporated. The residue is crystallized twice from a mixture of methanol and diisopropylether, yielding 1-(2-aminoethyl)-2-methyl-5-nitroimidazole dihydrobromide.

Example II

To a stirred mixture of 68.2 parts of 2-isopropyl-4(5)-nitroimidazole in 280 parts of methylene chloride and 50 parts of glacial acetic acid are added 67 parts of boron fluoride ethyl ether, while stirring. The resulting complex is cooled and at a temperature below −2°C, there are added dropwise 92 parts of 1-benzoylaziridine. Upon completion, the whole is stirred for one hour at 0°C. The cooling-bath is removed and the mixture is allowed to come to room temperature and stirred for 2 days. The reaction mixture is evaporated. The residue is taken up in water and methylene chloride, alkalized till a pH of 9–10 and the layers are separated. The organic phase is washed twice with water, dried and evaporated. The residue is stirred twice in petroleumether and then converted into the hydrobromide salt in acetone. The crude salt is filtered off and crystallized from a mixture of ethanol and diisopropylether, yielding N-[2-(2-isopropyl-5-nitro-1-imidazolyl)ethyl]benzamide hydrobromide, mp. 200.5°C.

A mixture of 32 parts of N-[2-(2-isopropyl-5-nitro-1-imidazolyl)ethyl]benzamide hydrobromide, and 125 parts of hydrobromic acid solution 48% is stirred and refluxed for 40 hours. The reaction mixture is cooled, filtered and the filtrate is evaporated in vacuo. The solid residue is triturated in a mixture of acetone and ether. The less pure fraction is filtered off and crystallized from a mixture of water and acetone, yielding 2-isopropyl-5-nitro-1-imidazoleethylamine hydrobromide, mp. 234.7°C.

Example III to a solution of 19 parts of 2-ethyl-4(5)-nitroimidazole in 100 parts of acetic acid and 150 parts of chloroform are added 22.5 parts of 1-benzoylaziridine while stirring and cooling in a water-bath. The reaction mixture is further stirred overnight (about 16 hours) and then diluted with 300 parts of chloroform. The organic layer is washed successively with water, with a 5N sodium hydroxide solution and again with water, filtered and the solvent is evaporated in vacuo. The residue is converted into the nitrate salt in 4-methyl-2-pentanone. Upon the addition of diisopropylether, the salt is precipitated. It is filtered off and crystallized twice: first from 2-propanol and then from ethanol, yielding N-[2-(2-ethyl-5-nitro-1-imidazolyl)ethyl]benzamide nitrate, mp. 148.5°C.

A mixture of 30 parts of N-[2-(2-ethyl-5-nitro-1-imidazolyl)ethyl]benzamide and 240 parts of hydrobromic acid solution 48% is stirred and refluxed overnight. The reaction mixture is allowed to cool to room temperature and the precipitated benzoic acid is filtered off. The latter is washed on the filter with water and the solvent is removed in vacuo. The residue is triturated in acetone. The product is filtered off and crystallized from a mixture of methanol and diisopropylether with 3 drops of a 48% hydrobromic acid solution (activated charcoal), yielding 1-(2-aminoethyl)-2-ethyl-5-nitroimidazole dihydrobromide.

Example IV

To a stirred solution of 16 parts of 4(5)-nitro-2-propylimidazole and 11.2 parts of boron fluoride methyl ether in 125 parts of chloroform is added dropwise (over a period of 1 hour) a solution of 24.3 parts of 1-benzoylaziridine in 25 parts of chloroform, while cooling in an ice-bath. Upon completion, the whole is stirred for 30 minutes and the whole is diluted with 300 parts of chloroform. The reaction mixture is washed successively twice with a 5N sodium hydroxide solution and once with water. The organic layer is dried, filtered and stirred for 30 minutes with 10 parts of silica gel. The latter is filtered and the solvent is evaporated in vacuo. The residue is triturated in diisopropylether. The product is filtered off and crystallized from a mixture of 2-propanol and water, yielding N-[2-(5-nitro-2-propyl-1-imidazolyl)ethyl]benzamide, mp. 122.6°C.

A mixture of 19 parts of N-[2-(5-nitro-2-propyl-1-imidazolyl)ethyl]benzamide and 150 parts of hydrobromic acid solution 48% is stirred and refluxed overnight. The reaction mixture is allowed to cool to room temperature. The formed precipitate is filtered off and the solvent is removed from the filtrate in vacuo. The residue is triturated in acetone and the product is filtered off and dried, yielding 1-(2-aminoethyl)-5-nitro-2-propylimidazole dihydrobromide.

Example V

To a stirred and cooled mixture of 5.3 parts of 2-(p-fluorophenyl)-4(5)-nitroimidazole and 3 parts of boron fluoride methyl ether in 100 parts of acetic acid and 30 parts of chloroform is added dropwise a solution of 7.4 parts of 1-benzoylaziridine in 120 parts of chloroform in the course of 2 hours and at a temperature of 0°–5°C. (cooling in an ice-bath). The solvent is evaporated in vacuo and the residue is dissolved in chloroform. The solution is washed three times with diluted sodium hydroxide solution and the solvent is evaporated in vacuo. The residue is dissolved in benzene and the product is extracted with hydrochloric acid solution 6N. The solution is alkalized with sodium hydroxide, whereupon the product is crystallized. It is filtered off, washed with water and recrystallized from a mixture of 2-propanol and water, yielding N-{2-[2-(p-fluorophenyl)-5-nitro-1-imidazolyl]ethyl}benzamide, mp. 168.3°C.

A mixture of 4.5 parts of N-{2-[2-(p-fluorophenyl)-5-nitro-1-imidazolyl]ethyl}benzamide and 160 parts of hydrobromic acid solution 48% is stirred and refluxed overnight. The reaction mixture is allowed to cool to room temperature and the precipitated benzoic acid is filtered off. The solvent is removed from the filtrate in vacuo, yielding 1-(2-aminoethyl)-2-(p-fluorophenyl)-5-nitroimidazole dihydrobromide as a residue.

Example VI

To a stirred solution of 11.3 parts of 4(5)-nitroimidazole, 11.2 parts of boron fluoride methyl ether in 100 parts of acetic acid and 15 parts of chloroform is added dropwise a solution of 22.3 parts of 1-benzoylaziridine in 85 parts of chloroform while cooling at 5°–10°C (reactiontime: 1 hour). Upon completion, stirring is continued for 30 minutes. The reaction mixture is poured onto water and concentrated sodium hydroxide solution is added till pH 10. The product is extracted with chloroform. The latter is washed successively with diluted sodium hydroxide solution and with water, dried, filtered and evaporated. The residue is triturated in ether. The solid product is filtered off and crystallized from a mixture of 2-propanol and water, yielding less pure N-[2-(5-nitro-1-imidazolyl)-ethyl]-benzamide (mp. 130°C), which is recrystallized from 2-propanol to yield pure N-[2-(5-nitro-1-imidazolyl)ethyl]benzamide, mp. 137.5°C.

A mixture of 8 parts of N-[2-(5-nitro-1-imidazolyl)ethyl]benzamide and 150 parts of hydrobromic acid solution 48% is stirred and refluxed overnight. The reaction mixture is allowed to cool to room temperature. The precipitated benzoic acid is filtered off and washed on the filter with water. The solvent is removed in vacuo and the residue is triturated in acetone, yielding 1-(2-aminoethyl)-5-nitroimidazole dihydrobromide.

Example VII

To a stirred and cooled solution of 6.5 parts of 2-butyl-4(5)-nitroimidazole and 4.5 parts of boron fluoride methyl ether in 150 parts of chloroform and 20 parts of acetic acid is added dropwise a solution of 8.6 parts of 1-benzoylaziridine in 75 parts of chloroform at −5°C. Upon completion, stirring is continued for 5 minutes. The whole is washed with diluted sodium hydroxide solution and then with water. The solvent is dried and evaporated in vacuo. The residue is crystallized from toluene, yielding N-[2-(2-butyl-5-nitro-1-imidazolyl)ethyl]benzamide, mp. 124.5°C.

A mixture of 6.5 parts of N-[2-(2-butyl-5-nitro-1-imidazolyl)ethyl]benzamide and 100 parts of concentrated hydrochloric acid solution is stirred and refluxed overnight. The reaction mixture is allowed to cool to room temperature and the precipitated benzoic acid is filtered off and washed on the filter with water. The solvent is removed in vacuo, yielding 1-(2-aminoethyl)-

2-butyl-5-nitroimidazole dihydrochloride as a residue.

Example VIII

To a stirred mixture of 9 parts of 2-phenyl-4(5)-nitroimidazole, 5.6 parts of boron fluoride methyl ether and 80 parts of acetonitrile is added dropwise a solution of 11.1 parts of 1-benzoylaziridine in 150 parts of chloroform while stirring in a water-bath for one hour at room temperature. Upon completion, stirring is continued for one hour. Water is added (1000 parts) followed by the addition of 50 parts of a concentrated sodium hydroxide solution. The product is extracted with chloroform. The organic phase is washed with water, dried, filtered and evaporated in vacuo. The residue is purified by column-chromatography over silicagel, using a mixture of chloroform and 3% of methanol. The pure fractions are collected and crystallized from 2-propanol, yielding N-[2-(5-nitro-2-phenyl-1-imidazolyl)ethyl]benzamide; mp. 163°C.

A mixture of 6 parts of N-[2-(5-nitro-2-phenyl-1-imidazolyl)ethyl]benzamide and 150 parts of hydrobromic acid solution 48% is stirred and refluxed overnight. The reaction mixture is allowed to cool to room temperature. The formed precipitate is filtered off and the solvent is evaporated from the filtrate in vacuo, yielding 1-(2-aminoethyl)-5-nitro-2-phenylimidazole dihydrobromide as a residue.

Example IX

To a stirred solution of 6.5 parts of 5-nitro-2-pentylimidazole and 3.8 parts of boron fluoride methyl ether in 150 parts of chloroform is added dropwise a solution of 8.4 parts of 1-benzoylaziridine in 150 parts of chloroform at 0°C (cooling in an ice-bath). Upon completion, the reaction mixture is washed successively twice with a sodium hydroxide solution and once with water. The solvent is removed in vacuo and the residue is dissolved in chloroform. The solution is stirred for 30 minutes with 3 parts of silicagel. The latter is filtered off and the filtrate is evaporated in vacuo. The residue is converted into the nitrate salt in 4-methyl-2-pentanone. The crude salt is crystallized from 4-methyl-2-pentanone. The resulting product is converted into the free base in the conventional manner. The free base is crystallized from diisopropylether yielding N-[2-(5-nitro-2-pentyl-1-imidazolyl)ethyl]benzamide; mp. 107.8°C.

A mixture of 6.5 parts of N-[2-(5-nitro-2-pentyl-1-imidazoly)ethyl]benzamide and 100 parts of concentrated hydrochloric acid solution is stirred and refluxed overnight. The precipitated benzoic acid is filtered off at room temperature and the solvent is removed in vacuo, yielding 1-(2-aminoethyl)-5-nitro-2-pentylimidazole dihydrochloride as a residue.

Example X

To a stirred and cooled (ice-bath) complex of 6.3 parts of 2-methyl-4(5)-nitroimidazole and 7.5 parts of boron fluoride ethyl ether in 20 parts of glacial acetic acid are added dropwise 8.1 parts of 1-benzoylaziridine while keeping the temperature below 5°C. Upon completion, stirring is continued first for 30 minutes at 5°C and further for 2 hours at room temperature. The acetic acid is evaporated in vacuo and the residue is divided between water and chloroform. The whole is alkalized with ammonium hydroxide and the organic layer is separated, dried and evaporated. The residue is stirred in a mixture of 2-propanol and diisopropylether. The solid product is filtered off and crystallized from a mixture of 2-propanol and diisopropylether, yielding N-[2-(2-methyl-5-nitro-1-imidazolyl)-ethyl]benzamide; mp. 155.7°C.

A mixture of 5.5 parts of N-[2-(2-methyl-5-nitro-1-imidazolyl)ethyl]benzamide and 37.5 parts of hydrobromic acid solution 48% is stirred and refluxed for 17 hours. The reaction mixture is cooled, filtered and the filtrate is evaporated. The residue is stirred in acetone. The precipitated product is filtered off and crystallized from a mixture of methanol and acetone and a few drops of hydrobromic acid solution. The product is filtered off, dried in vacuo and recrystallized from a mixture of ethanol, water and diisopropylether. The less pure fraction is filtered off and boiled in methanol, yielding 1-(2-aminoethyl)-2-methyl-5-nitroimidazole hydrobromide; mp. 260.3°C.

Example XI

A sodium methoxide solution, prepared from 1.75 parts of sodium in 20 parts of methanol, is added quickly to a stirred mixture of 14 parts of N-[2-(2-methyl-5-nitro-1-imidazolyl)ethyl]benzamide and 7 parts of benzaldehyde in 25 parts of dimethylsulfoxide at room temperature. Upon completion, the whole is stirred for 2 hours. Water is added (400 parts) and the precipitated product is filtered off. It is washed thoroughly with methanol, filtered off again and crystallized from a mixture of dimethylformamide and water. The pure product is filtered off, washed with methanol and dried, yielding N-[2-(5-nitro-2-styryl-1-imidazolyl)ethyl]benzamide; mp. 210.8°–213.6°C.

Ozone is introduced through a mixture of 10 parts of N-[2-(5-nitro-2-styryl-1-imidazolyl)ethyl]benzamide, 80 parts of methanol and 130 parts of methylene chloride, while stirring and cooling in an ice-bath, till all solid enters solution. After stirring for 10 minutes, there is added dropwise a solution of 5 parts of sodium metabisulfite in 25 parts of water at a temperature below 10°C. Upon completion, stirring is continued for 10 minutes. The reaction mixture is poured onto 500 parts of water and the product is extracted twice with 260 parts of methylene chloride. The combined extracts are dried, filtered and evaporated (temperature: <35°C). The residue is washed three times with diisopropylether, yielding N-[2-(2-formyl-5-nitro-1-imidazolyl)ethyl]benzamide as an oil.

To a stirred and cooled (0°C.) solution of 8 parts of N-[2-(2-formyl-5-nitro-1-imidazolyl)ethyl]benzamide in 80 parts of ethanol are added 0.3 parts of sodium borohydride and stirring at 0°C is continued for 1h. 30. The reaction mixture is evaporated. Water is added to the residue and the whole is acidified with hydrochloric acid solution, whereupon the product is precipitated. It is filtered off and crystallized from 2-propanol, yielding N-{2-[2-(hydroxymethyl)-5-nitro-1-imidazoly]ethyl-} benzamide; mp. 166.5°C.

A mixture of 10 parts of N-{2-[2-(hydroxymethyl)-5-nitro-1-imidazolyl]ethyl}benzamide and 120 parts of concentrated hydrochloric acid solution is stirred and refluxed for 6 hours. The reaction mixture is cooled and the precipitated benzoic acid is filtered off. The filtrate is evaporated and the residue is crystallized twice: first from ethanol and then from methanol. The product is filtered off and dried, yielding 1-(2'-aminoethyl)-5-nitro-2-imidazolemethanol hydrochloride; mp. 197.8°C.

Example XII

To 80 parts of thionyl chloride are added portionwise 9 parts of N-{2-[2-(hydroxymethyl)-5-nitro-1-imidazolyl]ethyl}-benzamide, while stirring at room temperature. Upon completion, stirring is continued at reflux for 30 minutes. The reaction mixture is evaporated. The residue is taken up in 100 parts of water and neutralized with sodium bicarbonate. The precipitated product is filtered off and crystallized from 4-methyl-2-pentanone, yielding N-{2-[2-(chloromethyl)-5-nitro-1-imidazolyl]ethyl}benzamide; mp. 174.6°C.

A mixture of 5 parts of N-{2-[2-(chloromethyl)-5-nitro-1-imidazolyl]ethyl}benzamide and 80 parts of concentrated hydrochloric acid solution is stirred and refluxed overnight. The reaction mixture is cooled and filtered. The filtrate is evaporated, yielding 1-(2-aminoethyl)-2-(chloromethyl)-5-nitroimidazole hydrochloride as a residue.

B. PREPARATION OF FORMULA (I) FINAL PRODUCTS:

Example XIII

To a stirred solution of 6.6 parts of 1-(2-aminoethyl)-2-methyl-5-nitro-1-imidazole dihydrobromide in 30 parts of water are added carefully 6.7 parts of sodium hydrogen carbonate. Upon completion, there are added at once 2.4 parts of ethyl chloroformate and the whole is stirred for 3 hours at room temperature. The product is extracted with chloroform. The extract is dried, filtered and evaporated. The solid residue is boiled in chloroform with activated charcoal. The latter is filtered off and the filtrate is evaporated again. The residue is stirred in diisopropylether. The product is filtered off and dried, yielding ethyl N-[2-(2-methyl-5-nitro-1-imidazolyl)ethyl]carbamate; mp. 88.3°C.

Example XIV

To a stirred solution of 6.6 parts of 1-(2-aminoethyl)-2-methyl-5-nitroimidazole dihydrobromide in 30 parts of water are added carefully 6.7 parts of sodium hydrogen carbonate, followed by the addition of 2.5 parts of methyl chloroformate. Upon completion, stirring is continued for 2 hours at room temperature. The product is extracted with chloroform. The extract is dried, filtered and evaporated. The solid residue is crystallized from a mixture of benzene and 2-propanol (activated charcoal), yielding methyl N-[2-(2-methyl-5-nitro-1-imidazolyl)ethyl]carbamate; mp. 121.6°C.

Example XV

To a stirred solution of 10 parts of 1-(2-aminoethyl)-2-methyl-5-nitroimidazole dihydrobromide in 50 parts of water and 40 parts of methylene chloride are added portionwise 10 parts of sodium hydrogen carbonate. Upon completion, there are added 4.4 parts of O-methyl chlorothioformate in a small amount of methylene chloride. The whole is stirred for one hour at room temperature. The layers are separated and the organic phase is dried, filtered and evaporated. The residue is crystallized from ethanol, yielding O-methyl N-[2-(2-methyl-5-nitro-1-imidazolyl)ethyl]thiocarbamate, mp. 142.4°C (dec.).

Example XVI

To a stirred solution of 10 parts of 1-(2-aminoethyl)-2-methyl-5-nitroimidazole dihydrobromide in 50 parts of water and 40 parts of methylene chloride are added portionwise 10 parts of sodium hydrogen carbonate. Upon completion, there are added 5 parts of isopropyl chloroformate dissolved in a small quantity of methylene chloride. The whole is stirred for 2 hours at room temperature. The product is extracted with methylene chloride. The organic layer is dried, filtered and evaporated. The residue is crystallized from toluene and recrystallized from 2-propanol, yielding isopropyl N-[2-(2-methyl-5-nitro-1-imidazolyl)ethyl]carbamate, mp. 129.6°C.

Example XVII

A mixture of 10 parts of 1-(2-aminoethyl)-2-methyl-5-nitroimidazole dihydrobromide in 40 parts of methylene chloride and 50 parts of water is stirred till all solid enters solution. Then there are added portionwise 10 parts of sodium hydrogen carbonate, followed by the addition of 5.4 parts of butyl chloroformate in a small quantity of methylene chloride. Upon completion, the whole is stirred for 2 hours at room temperature. The layers are separated and the organic phase is dried, filtered and evaporated. The oil residue solidifies on scratching. The solid product is crystallized from diisopropylether with a small quantity of 2-propanol, yielding butyl N-[2-(2-methyl-5-nitro-1-imidazolyl)ethyl]carbamate, mp. 101°C.

Example XVIII

To a stirred mixture of 6.6 parts of 1-(2-aminoethyl)-2-methyl-5-nitroimidazole dihydrobromide, 10 parts of sodium hydrogen carbonate and 60 parts of methylene chloride are added 20 parts of water and stirring is continued till gas-evolution ceased. Then there are added 3.7 parts of pentyl chloroformate in a small amount of methylene chloride and the whole is stirred for 2 hours at room temperature. The organic layer is separated, dried, filtered and evaporated. The residue is purified by columnchromatography, using a mixture of chloroform and 5% of methanol. The pure fractions are collected and the solvent is evaporated. The residue is crystallized from diisopropylether, yielding pentyl N-[2-(2-methyl-5-nitro-1-imidazolyl)-ethyl]carbamate, mp. 110.4°C.

Example XIX

To a stirred mixture of 6.6 parts of 1-(2-aminoethyl)-2-methyl-5-nitroimidazole dihydrobromide, 10 parts of sodium hydrogen carbonate and 60 parts of methylene chloride are added 20 parts of water and stirring is continued till the gas-evolution ceased. Then there are added 3 parts of O-ethyl chlorothioformate in a minimal quantity of methylene chloride. The whole is stirred for 2 hours at room temperature. The organic layer is separated, dried, filtered and evaporated. The residue is crystallized from 2-propanol, yielding O-ethyl N-[2-(2-methyl-5-nitro-1-imidazolyl)ethyl]thiocarbamate, mp. 167.5°C.

Example XX

To a stirred mixture of 6.6 parts of 1-(2-aminoethyl)-2-methyl-5-nitroimidazole dihydrobromide, 10 parts of sodium hydrogen carbonate and 60 parts of methylene chloride are added 20 parts of water and stirring is continued till the gas-evolution ceased. Then there are added 3.7 parts of cyclopentyl chloroformate in a small quantity of methylene chloride and the whole is stirred for 2 hours at room temperature. The organic layer is separated, dried, filtered and evaporated. The residue is crystallized from 2-propanol, yielding cyclopentyl N-[2-(2-methyl-5-nitro-1-imidazolyl)ethyl]carbamate, mp. 151.1°C.

Example XXI

To a stirred mixture of 6.6 parts of 1-(2-aminoethyl)-2-methyl-5-nitroimidazole dihydrobromide, 10 parts of sodium hydrogen carbonate and 60 parts of methylene chloride are added 20 parts of water and stirring is continued till the gas-evolution ceased. Then there are added 3.5 parts of 2-methoxyethyl chloroformate in a small quantity of methylene chloride. The whole is further stirred for 2 hours at room temperature. The organic layer is separated, dried, filtered and evaporated. The residue is crystallized from 2-propanol, yielding 2-methoxyethyl N-[2-(2-methyl-5-nitro-1-imidazolyl)ethyl]carbamate, mp. 168.7°C (dec.).

Example XXII

To a stirred mixture of 5.6 parts of 2-isopropyl-5-nitro-1-imidazoleethylamine hydrobromide, 2.5 parts of methyl chloroformate and 10 parts of water are added carefully 3.4 parts of sodium hydrogen carbonate. Upon completion, stirring is continued overnight at room temperature. Then there are added 2 parts of sodium hydrogen carbonate and the whole is stirred for 10 minutes. The reaction mixture is extracted twice with ether. The latter is dried, filtered and evaporated. The residue is converted into the nitrate salt in acetone. The crystallized salt is filtered off and recrystallized from a mixture of methanol and diisopropylether, yielding methyl N-[2-(2-isopropyl-5-nitro-1-imidazolyl)ethyl]carbamate nitrate, mp. 155.2°C.

Example XXIII

To a stirred mixture of 7.2 parts of 2-isopropyl-5-nitro-1-imidazoleethylamine dihydrobromide, 10 parts of sodium hydrogen carbonate and 60 parts of methylene chloride are added 20 parts of water and stirring is continued till foaming ceased. When no more gas is evolved, there are added 2.7 parts of ethyl chloroformate in a small amount of methylene chloride. The whole is stirred for 2 hours at room temperature. The organic layer is separated, dried, filtered and evaporated. The residue is crystallized from a mixture of 2-propanol and diisopropylether, yielding ethyl N-[2-(2-isopropyl-5-nitro-1-imidazolyl)ethyl]carbamate, mp. 119.1°C.

Example XXIV

To a stirred mixture of 7.2 parts of 2-isopropyl-5-nitro-1-imidazoleethylamine dihydrobromide, 10 parts of sodium hydrogen carbonate and 60 parts of methylene chloride is added 20 parts of water and the whole is stirred till no more gas is evolved. Then there are added 3.4 parts of butyl chloroformate in a small quantity of methylene chloride. The whole is stirred for 2 hours at room temperature. The organic layer is separated, dried, filtered and evaporated. The oily residue is converted into the nitrate salt in diisopropylether. It is filtered off and crystallized from a mixture of ethanol and diisopropylether, yielding butyl N-[2-(2-isopropyl-5-nitro-1-imidazolyl)ethyl]carbamate nitrate, mp. 101.1°C.

Example XXV

To a stirred mixture of 7.2 parts of 2-isopropyl-5-nitro-1-imidazoleethylamine dihydrobromide, 10 parts of sodium hydrogen carbonate and 60 parts of methylene chloride are added 20 parts of water and stirring is continued till all gas evolution is ceased. Then there are added 3.7 parts of pentyl chloroformate in a small amount of methylene chloride. The whole is stirred for 2 hours at room temperature. The organic layer is separated, dried, filtered and evaporated. The residue is converted into the nitrate salt in diisopropylether. The salt is filtered off and crystallized from a mixture of 2-propanol and diisopropylether, yielding pentyl N-[2-(2-isopropyl-5-nitro-1-imidazolyl)ethyl]carbamate nitrate, mp. 98.1°C.

Example XXVI

To a stirred mixture of 7.2 parts of 2-isopropyl-5-nitro-1-imidazoleethylamine dihydrobromide, 10 parts of sodium hydrogen carbonate and 60 parts of methylene chloride are added 20 parts of water and the whole is stirred till gas-evolution ceased. Then there are added 3 parts of isopropyl chloroformate in a small quantity of methylene chloride. The whole is stirred for 2 hours at room temperature. The organic layer is separated, dried, filtered and evaporated. The residue is crystallized from diisopropylether, yielding isopropyl N-[2-(2-isopropyl-5-nitro-1-imidazolyl)ethyl]carbamate, mp. 103.2°C.

Example XXVII

To a stirred mixture of 7.2 parts of 2-isopropyl-5-nitro-1-imidazoleethylamine dihydrobromide, 10 parts of sodium hydrogen carbonate and 60 parts of methylene chloride are added 10 parts of water and stirring is continued till gas-evolution ceased. Then there are added 2.5 parts of O-methyl chlorothioformate in a minimal amount of methylene chloride. The whole is stirred for 1 hour at room temperature. The organic layer is separated, dried, filtered and evaporated. The oily residue solidifies on scratching. It is filtered off and crystallized from 2-propanol, yielding O-methyl N-[2-(2-isopropyl-5-nitro-1-imidazolyl)ethyl]thiocarbamate, mp. 126.1°C.

Example XXVIII

To a stirred mixture of 7.2 parts of 2-isopropyl-5-nitro-1-imidazoleethylamine dihydrobromide, 10 parts of sodium hydrogen carbonate and 60 parts of methylene chloride are added 20 parts of water and stirring is continued till the gas-evolution ceased. Then there are added 3 parts of O-ethyl chlorothioformate in a minimal amount of methylene chloride. The whole is stirred for 2 hours at room temperature. The organic layer is separated, dried, filtered and evaporated. The residue is crystallized from 2-propanol, yielding O-ethyl N-[2-(2-isopropyl-5-nitro-1-imidazolyl)ethyl]thiocarbamate, mp, 120.2°C.

Example XXIX

To a stirred mixture of 7.2 parts of 2-isopropyl-5-nitro-1-imidazoleethylamine dihydrobromide, 10 parts of sodium hydrogen carbonate and 60 parts of methylene chloride is added 20 parts of water and stirring is continued till the gas-evolution ceased. Then there are added 4 parts of cyclohexyl chloroformate in a minimal quantity of methylene chloride. The whole is stirred for 2 hours at room temperature. The organic layer is separated, dried, filtered and evaporated. The residue is crystallized from diisopropylether, yielding cyclohexyl N-[2-(2-isopropyl-5-nitro-1-imidazolyl)ethyl]carbamate, mp. 96°C.

Example XXX

To a stirred mixture of 7.2 parts of 2-isopropyl-5-nitro-1-imidazoleethylamine dihydrobromide, 10 parts of sodium hydrogen carbonate and 60 parts of methylene chloride are added 20 parts of water and stirring is continued till the gas-evolution ceased. Then there are added 3.7 parts of cyclopentyl chloroformate in a small quantity of methylene chloride and the whole is stirred for 2 hours at room temperature. The organic layer is separated, dried, filtered and evaporated. The oily residue solidifies on standing. The solid product is crystallized from a mixture of ethyl acetate and diisopropylether, yielding cyclopentyl N-[2-(2-isopropyl-5-nitro-1-imidazolyl)ethyl]carbamate, mp. 126.1°C.

Example XXXI

To a stirred mixture of 7.2 parts of 2-isopropyl-5-nitro-1-imidazoleethylamine dihydrobromide, 10 parts of sodium hydrogen carbonate and 60 parts of methylene chloride are added 20 parts of water and stirring is continued till the gas-evolution is ceased. Then there are added 3 parts of allyl chloroformate in a small quantity of methylene chloride and the whole is stirred for 2 hours at room temperature. The organic layer is separated, dried, filtered and evaporated. The residue is converted into the nitrate salt in ether. The crude salt is filtered off and crystallized from a mixture of ethanol and diisopropylether, yielding allyl N-[2-(2-isopropyl-5-nitro-1-imidazolyl)ethyl]carbamate nitrate, mp. 129.1°C.

Example XXXII

A mixture of 8 parts of 1-(2-aminoethyl)-2-ethyl-5-nitroimidazole dihydrobromide, 4.2 parts of O-methyl chlorothioformate, 4.4 parts of sodium carbonate, 20 parts of water and 75 parts of chloroform is stirred for 4 hours in an ice-bath. The reaction mixture is washed twice with water, filtered and the solvent is removed in vacuo. The residue is dissolved in benzene and the product is extracted with 50 parts of a 5N hydrochloric acid solution (three times). The whole is washed with benzene and the acid aqueous phase is neutralized with sodium hydrogen carbonate. The product is extracted with chloroform. The extract is dried, filtered and evaporated. The residue is crystallized from toluene (activated charcoal), yielding crude O-methyl N-[2-(2-ethyl-5-nitro-1-imidazolyl)ethyl]thiocarbamate. This fraction is dissolved in chloroform, stirred with silica gel, filtered and the solvent is evaporated in vacuo. The residue is crystallized from 2-propanol, yielding O-methyl N-[2-(2-ethyl-5-nitro-1-imidazolyl)ethyl]thiocarbamate, mp. 134.9°C.

Example XXXIII

A mixture of 19 parts of 1-(2-aminoethyl)-2-ethyl-5-nitroimidazole dihydrobromide, 12.4 parts of O-ethyl chlorothioformate, 20 parts of sodium hydrogen carbonate, 150 parts of chloroform and 100 parts of water is stirred for 3 hours while cooling in an ice-bath. The layers are separated and the organic phase is washed with water, dried, filtered and evaporated in vacuo. The residue is triturated in diisopropylether. The solid product is filtered off and crystallized from 2-propanol, yielding O-ethyl N-[2-(2-ethyl-5-nitro-1-imidazolyl)ethyl]thiocarbamate, mp. 118.6°C.

Example XXXIV

A mixture of 14 parts of 1-(2-aminoethyl)-5-nitro-2-propylimidazole dihydrobromide, 5.5 parts of O-methyl chlorothioformate, 12.6 parts of sodium hydrogen carbonate, 150 parts of chloroform and 50 parts of water is stirred for 3 hours at room temperature. The chloroform phase is washed twice with water, dried, filtered and evaporated in vacuo. The residue is triturated for 2 hours in 28 parts of 2-propanol in an ice-bath. The precipitated product is filtered off and crystallized from 2-propanol, yielding O-methyl N-[2-(5-nitro-2-propyl-1-imidazolyl)ethyl]thiocarbamate, mp. 113.4°C.

Example XXXV

A mixture of 5.5 parts of 1-(2-aminoethyl)-2-(p-fluorophenyl)-5-nitroimidazole dihydrobromide, 4.8 parts of O-methyl chlorothioformate, 15 parts of sodium hydrogen carbonate, 80 parts of methylene chloride and 100 parts of water is stirred for 3 hours while cooling in an ice-bath. The organic layer is separated, dried, filtered and evaporated in vacuo. The residue is crystallized from 2-propanol, yielding O-methyl N-{2-[2-(p-fluorophenyl)-5-nitro-1-imidazolyl]ethyl}thiocarbamate, mp. 169.8°C.

Example XXXVI

By repeating the procedure of Example XXX, except that an equivalent quantity each of methyl chloroformate, 2-methoxyethyl chloroformate, cyclopentyl chloroformate and allyl chloroformate is substituted for the O-methyl chlorothioformate used therein, the following respective products are obtained:
  methyl N-{2-[2-(2-(p-fluorophenyl)-5-nitro-1-imidazolyl]ethyl}carbamate;
  2-methoxyethyl N-{2-[2-2-(p-fluorophenyl)-5-nitro-1-imidazolyl]ethyl}carbamate;
  cyclopentyl N-{2-[2-(2-(p-fluorophenyl)-5-nitro-1-imidazolyl]}carbamate; and
  allyl N-{2-[2-(2-(p-fluorophenyl)-5-nitro-1-imidazolyl]ethyl}carbamate.

Example XXXVII

To a stirred solution of 9.5 parts of 1-(2-aminoethyl)-5-nitroimidazole dihydrobromide and 5.3 parts of sodium carbonate in 40 parts of methanol and 50 parts of water are added dropwise 4.4 parts of O-methyl chlorothioformate while cooling in an ice-bath for one hour. Upon completion, the whole is stirred for an additional hour. The reaction mixture is diluted with water and the product is extracted with chloroform. The solvent is dried and evaporated. The residue is triturated in a mixture of 2-propanol and water. The solid product is filtered off and crystallized from a mixture of 2-propanol and water, yielding O-methyl N-[2-(5-nitro-1-imidazolyl)ethyl]thiocarbamate, mp. 80.9°C.

Example XXXVIII

The procedure of Example XXXII is followed, except that an equivalent quantity each of ethyl chloroformate, 2-methoxyethyl chloroformate, cyclohexyl chloroformate and allyl chloroformate is substituted for the O-methyl chlorothioformate used therein, to yield the following respective products:

ethyl N-[2-(5-nitro-1-imidazolyl)ethyl]carbamate;
2-methoxyethyl N-[2-(5-nitro-1-imidazolyl)ethyl]-carbamate;
cyclohexyl N-[2-(5-nitro-1-imidazolyl)ethyl]carbamate; and
allyl N-[2-(5-nitro-1-imidazolyl)ethyl]carbamate.

Example XXXIX

To a stirred solution of 5.6 parts of 1-(2-aminoethyl)-2-butyl-5-nitroimidazole dihydrochloride in 100 parts of water are added successively 5 parts of sodium hydrogen carbonate, 80 parts of benzene and 2.8 parts of O-methyl chlorothioformate at room temperature. Upon completion, stirring is continued for one hour. The benzene phase is separated, dried, filtered and evaporated. The residue is crystallized from carbon tetrachloride, yielding O-methyl N-[2-(2-butyl-5-nitro-1-imidazolyl)ethyl]thiocarbamate, mp. 111°C.

Example XL

A mixture of 7.9 parts of 1-(2-aminoethyl)-5-nitro-2-phenylimidazole dihydrobromide, 2.4 parts of O-methyl chlorothioformate, 80 parts of methylene chloride, 100 parts of water and 6 parts of sodium hydrogen carbonate is stirred for 3 hours while cooling in an ice-bath. The precipitated product is filtered off and crystallized from ethanol, yielding O-methyl N-[2-(5-nitro-2-phenyl-1-imidazolyl)ethyl]thiocarbamate; mp. 200.6°C. (dec.).

Example XLI

The procedure of Example XL is followed, except that equivalent quantities of 1-(2-aminoethyl)-2-phenyl-5-nitroimidazole dihydrobromide and an appropriate chloroformate or chlorothioformate are employed as reactants, to yield the following respective products:
isopropyl N-[2-(2-phenyl-5-nitro-1-imidazolyl)ethyl]carbamate;
2-methoxyethyl N-[2-(2-phenyl-5-nitro-1-imidazolyl)ethyl]carbamate;
cyclohexyl N-[2-(2-phenyl-5-nitro-1-imidazolyl)ethyl]carbamate;
O-ethyl N-[2-(2-phenyl-5-nitro-1-imidazolyl)ethyl]thiocarbamate; and
allyl N-[2-(2-phenyl-5-nitro-1-imidazolyl)ethyl]carbamate.

Example XLII

To a stirred mixture of 6.6 parts of 1-(2-aminoethyl)-2-methyl-5-nitroimidazole dihydrobromide, 10 parts of sodium hydrogen carbonate and 60 parts of methylene chloride are added 20 parts of water and stirring is continued till the gas-evolution ceased. Then there are added 4 parts of cyclohexyl chloroformate in a small amount of methylene chloride and the whole is further stirred for 2 hours at room temperature. The organic layer is separated, dried, filtered and evaporated. The residue is crystallized from 2-propanol, yielding cyclohexyl N-[2-(2-methyl-5-nitro-1-imidazolyl)ethyl]carbamate; mp. 167°C.

Example XLIII

To a stirred mixture of 6.6 parts of 1-(2-aminoethyl)-2-methyl-5-nitroimidazole dihydrobromide, 10 parts of sodium hydrogen carbonate and 60 parts of methylene chloride are added 20 parts of water and stirring is continued till the gas-evolution ceased. Then there are added 3 parts of allyl chloroformate in a small quantity of methylene chloride and the whole is stirred for 2 hours at room temperature. The organic layer is separated, dried, filtered and evaporated. The residue is purified by column-chromatography over silicagel, using a mixture of chloroform and 5% of methanol. The pure fractions are collected and the solvent is evaporated. The residue is crystallized from a mixture of dioxane and petroleumether, yielding allyl N-[2-(2-methyl-5-nitro-1-imidazolyl)ethyl]carbamate; mp. 108.3°C.

Example XLIV

To a stirred mixture of 6.6 parts of 1-(2-aminoethyl)-2-methyl-5-nitroimidazole dihydrobromide, 10 parts of sodium hydrogen carbonate and 60 parts of methylene chloride are added 20 parts of water and the whole is stirred till no more gas is evolved. Then there are added 4.2 parts of 2-(isopropoxy)ethyl chloroformate in a small quantity of methylene chloride and the whole is stirred for 2 hours at room temperature. The layers are separated and the organic phase is dried, filtered and evaporated. The solid residue is crystallized from 2-propanol, yielding 2-(isopropoxy)ethyl N-[2-(2-methyl-5-nitro-1-imidazolyl)ethyl]carbamate; mp. 134°C.

Example XLV

To a stirred solution of 5.9 parts of 1-(2-aminoethyl)-5-nitro-2-pentylimidazole dihydrochloride in 100 parts of water are added 5.1 parts of sodium hydrogen carbonate and 80 parts of benzene, followed by the addition of 2.5 parts of O-methyl chlorothioformate at room temperature. Upon completion, stirring is continued for one hour. The benzene-phase is separated, dried, filtered and evaporated. The residue is crystallized from diisopropylether (activated charcoal), yielding O-methyl N-[2-(5-nitro-2-pentyl-1-imidazolyl)ethyl]thiocarbamate; mp. 121°–124°C.

Example XLVI

A solution of 4 parts of 1-(2-aminoethyl)-2-(chloromethyl)-5-nitroimidazole hydrochloride in 40 parts of water is neutralized with sodium bicarbonate. After stirring for 5 minutes, there is added a solution of 2 parts of methyl chloroformate in 150 parts of chloroform. The whole is stirred for 1h. 30. The chloroform-phase is separated, dried, filtered and evaporated. The residue is purified by column-chromatography over silicagel, using chloroform as eluent. The pure fractions are collected and the eluent is evaporated. The residue is crystallized from water, yielding methyl N-{2-[2-(chloromethyl)-5-nitro-1-imidazolyl]ethyl}carbamate; mp. 97°C.

Example XLVII

To a stirred solution of 7.57 parts of 1-(2-aminoethyl)-5-nitro-2-imidazolemethanol hydrochloride in 50 parts of water are added 6 parts of 2-(1-methoxy-1-thioxomethylthio)acetic acid and an excess of sodium bicarbonate till pH 8. The whole is stirred at room temperature for 15 hours. The precipitated product is filtered off and purified by column-chromatography over silicagel, using a mixture of chloroform and 5% of methanol as eluent. The pure fractions are collected and the eluent is evaporated. The residue is crystallized from water, yielding methyl N-{2-[2-(hydroxymethyl)-5-nitro-1-imidazolyl]ethyl}thiocarbamate; mp. 135.3°C.

Example XLVIII

To a stirred mixture of 5.8 parts of O-methyl S-methylthioformate and 80 parts of methanol are added 5.1 parts of 1-(2-aminoethyl)-2-methyl-5-nitroimidazole and the whole is stirred at room temperature for 48 hours. The reaction mixture is evaporated and the residue is triturated in 100 parts of water. The product is filtered off and crystallized from 2-propanol, yielding 3 parts of O-methyl N-[2-(2-methyl-5-nitro-1-imidazolyl)ethyl]thiocarbamate; mp. 147.5°C.

Example IL

A solution of 10 parts of O-methyl N-[2-(2-methyl-5-nitro-1-imidazolyl)ethyl]-2-thiocarbamate in 140 parts of acetone is acidified with an excess of 2-propanol previously saturated with gaseous hydrogen chloride at room temperature. After standing for one hour at room temperature, the hydrochloride salt is precipitated. It is filtered off, washed with acetone and dried in vacuo at 40°C., yielding O-methyl N-[2-(2-methyl-5-nitro-1-imidazolyl)ethyl]-2-thiocarbamate hydrochloride; mp. 163.9°C.

We claim:

1. A chemical compound selected from the group consisting of a nitroimidazole derivative having the formula:

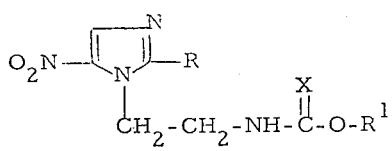

and the therapeutically active acid addition salts thereof, wherein:
 X is a member selected from the group consisting of O and S;
 R is a member selected from the group consisting of hydrogen, loweralkyl, phenyl, halophenyl, halomethyl and hydroxymethyl; and
 $R^1$ is a member selected from the group consisting of loweralkyl, loweralkenyl, cyclopentyl, cyclohexyl and loweralkoxy-loweralkyl.

2. A chemical compound selected from the group consisting of a nitroimidazole derivative having the formula:

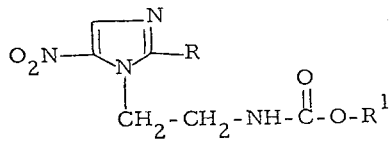

and the therapeutically active acid addition salts thereof, wherein:
 R is a member selected from the group consisting of hydrogen, loweralkyl, phenyl, halophenyl, halomethyl and hydroxymethyl; and
 $R^1$ is a member selected from the group consisting of loweralkyl, loweralkenyl, cyclopentyl, cyclohexyl and loweralkoxy-loweralkyl.

3. A chemical compound selected from the group consisting of a nitroimidazole derivative having the formula:

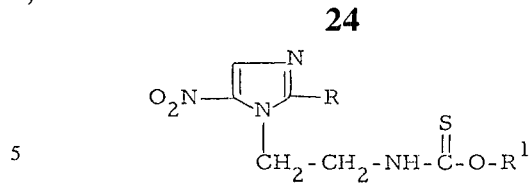

and the therapeutically active acid addition salts thereof, wherein:
 R is a member selected from the group consisting of hydrogen, loweralkyl, phenyl, halophenyl, halomethyl and hydroxymethyl; and
 $R^1$ is a member selected from the group consisting of loweralkyl, loweralkenyl, cyclopentyl, cyclohexyl and loweralkoxy-loweralkyl.

4. A chemical compound selected from the group consisting of a nitroimidazole derivative having the formula:

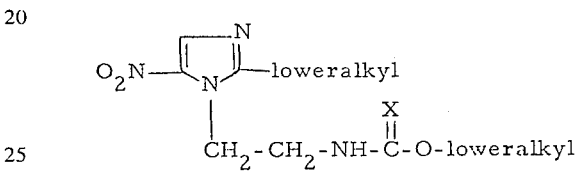

and the therapeutically active acid addition salts thereof, wherein X is a member selected from the group consisting of O and S.

5. Loweralkyl N-[2-(2-loweralkyl-5-nitro-1-imidazolyl)ethyl]carbamate.
6. O-Loweralkyl N-[2-(2-loweralkyl-5-nitro-1-imidazolyl)ethyl]thiocarbamate.
7. Ethyl N-[2-(2-methyl-5-nitro-1-imidazolyl)ethyl]carbamate.
8. Methyl N-[2-(2-methyl-5-nitro-1-imidazolyl)ethyl]carbamate.
9. O-Methyl N-[2-(2-methyl-5-nitro-1-imidazolyl)ethyl]thiocarbamate.
10. Isopropyl N-[2-(2-methyl-5-nitro-1-imidazolyl)ethyl]carbamate.
11. Pentyl N-[2-(2-methyl-5-nitro-1-imidazolyl)ethyl]carbamate.
12. Methyl N-[2-(2-isopropyl-5-nitro-1-imidazolyl)ethyl]carbamate.
13. Ethyl N-[2-(2-isopropyl-5-nitro-1-imidazolyl)ethyl]carbamate.
14. Butyl N-[2-(2-isopropyl-5-nitro-1-imidazolyl)ethyl]carbamate.
15. Isopropyl N-[2-(2-isopropyl-5-nitro-1-imidazolyl)ethyl]carbamate.
16. O-Methyl N[2-(2-isopropyl-5-nitro-1-imidazolyl)ethyl]thiocarbamate.
17. O-Ethyl N-[2-(2-isopropyl-5-nitro-1-imidazolyl)ethyl]thiocarbamate.
18. Allyl N-[2-(2-isopropyl-5-nitro-1-imidazolyl)ethyl]carbamate.
19. O-Methyl N[2-(2-ethyl-5-nitro-1-imidazolyl)ethyl]thiocarbamate.
20. O-Ethyl N-[2-(2-ethyl-5-nitro-1-imidazolyl)ethyl]thiocarbamate.
21. O-Methyl N-[2-(5-nitro-2-propyl-1-imidazolyl)ethyl]thiocarbamate.
22. O-Methyl N-{2-[2-(p-fluorophenyl)-5-nitro-1-imidazolyl]ethyl}thiocarbamate.
23. O-Methyl N-{2-[2-(hydroxymethyl)-5-nitro-1-imidazolyl]ethyl}thiocarbamate.

24. Methyl N-{2-[2-(chloromethyl)-5-nitro-1-imidazolyl]ethyl}carbamate.
25. A chemical compound selected from the group consisting of a nitroimidazole derivative having the formula:
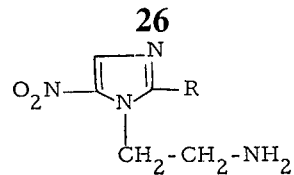
and acid addition salts thereof, wherein R is a member selected from the group consisting of phenyl, halophenyl, halomethyl and hydroxymethyl.
* * * * *